United States Patent [19]

Yamanaka et al.

[11] 4,165,327

[45] Aug. 21, 1979

[54] PROCESS FOR PRODUCING LOWER ALLERGENIC LANOLIN OR DERIVATIVES THEREOF

[75] Inventors: Makoto Yamanaka, Koganei; Satoshi Takano, Funabashi; Tsuruo Mikata, Kashiwa; Kikuhiko Okamoto, Koshigaya, all of Japan

[73] Assignee: Kao Soap Co., Ltd., Tokyo, Japan

[21] Appl. No.: 809,870

[22] Filed: Jun. 24, 1977

[30] Foreign Application Priority Data

Jul. 7, 1976 [JP] Japan .................................. 51/80571

[51] Int. Cl.² .......................... C07J 9/00; C11C 1/08
[52] U.S. Cl. ............................. 260/397.25; 260/419; 260/397.2; 568/917
[58] Field of Search ............. 260/397.2, 397.25, 428.5, 260/419; 568/917

[56] References Cited

U.S. PATENT DOCUMENTS

| | | | |
|---|---|---|---|
| 2,573,891 | 11/1951 | Christenson | 260/397.25 |
| 2,619,495 | 11/1952 | Christenson | 260/397.25 |
| 2,679,503 | 5/1954 | Christenson | 260/397.25 |
| 3,526,647 | 9/1970 | Sunde | 260/397.25 |

OTHER PUBLICATIONS

Peter et al., Der Hautarzt, vol. 20, No. 10 (1965), p. 455.

*Primary Examiner*—John Niebling
*Attorney, Agent, or Firm*—Oblon, Fisher, Spivak, McClelland & Maier

[57] ABSTRACT

A process is provided for producing a lower allergenic lanolin or derivative thereof by liquid-liquid extracting lanolin or its derivative with a non-polar hydrocarbon solvent and a mixed solvent of water with a lower alcohol. The non-polar hydrocarbon solvent extract is then recovered.

7 Claims, No Drawings

4,165,327

PROCESS FOR PRODUCING LOWER ALLERGENIC LANOLIN OR DERIVATIVES THEREOF

BACKGROUND OF THE INVENTION

1. Field of the Invention

This invention relates to a process for producing lanolin of lower allergen content, non-allergenic lanolin and derivatives thereof.

2. Description of the Prior Art

Lanolin is a higher fatty acid ester with a higher alcohol or sterol. The predominant fatty acid component includes nine chemical forms of normal-, iso- and anteiso-isomers of an alkane acid, and an $\alpha$- and $\omega$-hydroxy acid. The alcohol component of lanolin includes six chemical forms of normal-, iso- and anteiso-isomers of a mono-alcohol and an $\alpha,\beta$-diol, and several sterols. Lanolin is considered to be a mixture of these alcohols and acids. Additionally, lanolin contains several percent of substances, the structures of which are still unknown. Lanolin is remarkable in that it contains no majority component, though it has a sterol content of about 30%. Thus sterol may be considered to be the main component of lanolin.

Lanolin has hitherto been widely used as a base for drug ointments and for cosmetic creams, lotions and the like. However, lanolin frequently induces allergic reactions at an occurrence frequency ranging from 1 to 18% in patients suffering from dermatitises. Lanolin-induced allergic reactions have been observed with the same or greater frequency as found with allergens such as nickel, chromium, p-phenylenylenediamine and the like, but with less occurrence than with formaldehyde.

The first report on the lanolin-induced allergic reactions, made by Marcus in 1922, was concerned with results obtained with the use of a lanolin alcohol cream as the test compound. In the report, however, no mention was made of what acted as an allergen in the test compound. Thereafter, although many experiments with lanolin were conducted by Sezary et al in 1936, they merely designated a lanolin compound in generalized terminology as an allergen because of the complicated chemical composition of lanolin. Fanburg first estimated lanolin alcohol to be an allergen in 1940, and many studies were then made on lanolin, lanolin alcohol and lanolin derivatives by many researchers over a prolonged period of 30 years. Notwithstanding their energetic efforts, no substances acting as an allergen have been identified to date due to the difficulty of allergy test judgement and the complicated chemical structure of lanolin.

SUMMARY OF THE INVENTION

In view of the above circumstances, the present inventors have examined a wide variety of methods of eliminating the allergen from lanolin, and as a result, have found that substances having specific values of Rf induce allergy. Based on this finding, the inventors have developed a process for producing lanolin with lower allergen content and non-allergenic lanolin and derivatives thereof. Lanolin or its derivative is subjected to column chromatography with a colum packed with magnesium silicate as the adsorbent, followed by elution with a non-polar solvent, and the eluate is collected (U.S. patent application Ser. No. 717,403, filed Aug. 24, 1976.

The copending application is directed to a process for the preparation of a non-allergenic lanolin and a derivative thereof, but this process is not necessarily industrially acceptable from economic consideration because of the use of a fairly expensive adsorbent.

Considering the problems noted previously, the present inventors have made a large number of experiments in an effort to develop an industrially acceptable process for producing a lower allergenic lanolin or a derivative thereof in a simple and efficient manner and have discovered that the allergen can be removed by liquid-liquid extraction with the use of a specific non-polar solvent and a polar solvent which dissolves the allergen.

DETAILED DESCRIPTION OF THE PREFERRED EMBODIMENTS

It is, therefore, an object of the invention to provide a process for producing a lower allergenic lanolin or a derivative thereof by liquid-liquid extraction of lanolin or a derivative with a non-polar hydrocarbon solvent and a mixed solvent of water-lower alcohol and collecting the non-polar hydrocarbon solvent extract.

Lanolin or its derivative to be prepared according to the present invention includes, for example, lanolin, lanolin wax, liquid lanolin, hydrogenated lanolin, acetylated lanolin, lanolin alcohol, acetylated lanolin alcohol, lanolin fatty acid ester and the like.

Suitable non-polar hydrocarbon solvent include alkanes such as propane, butane, pentane, hexane, heptane, octane, nonane and decane; alkenes such as propylene, butene, pentene, hexene, heptene, octene, monene and decene; dienes, trienes, alkynes; cycloparaffins such as cyclobutane and cyclohexane; cycloolefins such as cyclohexene; and aromatic hydrocarbons such as benzene, toluene and xylene. They may be used solely or in combination of any selected two or more compounds. For example, petroleum ether, petroleum benzin, naphtha and liquid paraffin are used as a mixed solvent.

The preferred polar solvent is a mixture of water and a lower alcohol with a lower alcohol to water ratio of 0.05 to 10 by weight. The lower alcohols may be selected from methanol, ethanol, n-propanol, isopropanol, n-butanol, sec-butanol, tert-butanol and the like.

In carrying out the process of the invention, lanolin or a derivative thereof is liquid-liquid extracted with a non-polar hydrocarbon solvent and a mixed solvent of water-lower alcohol and the non-polar hydrocarbon solvent layer is collected. In particular, no limitations are imposed on the ratio of the mixed solvent of water-lower alcohol relative to the non-polar hydrocarbon solvent, but the ratio is preferably 0.1 to 10 by weight.

The non-polar hydrocarbon solvent is preferably used in such an amount as described above and in equivalency to lanolin or a derivative thereof. Any liquid-liquid extracting methods known per se may be applicable to the invention. For example, the most simplified method is a batch system, wherein lanolin or its derivative is mixed with both solvents, and after standing, the non-polar hydrocarbon solvent layer is collected. Various types of extractors may be used in the present invention, and a typical example is a centrifugal extractor such as a Podbielniak rotating sector extractor, packed tower-type extractor, spray tower-type extractor, perforated plate extractor or the like.

The recovered non-polar hydrocarbon solvent layer containing the lower allergenic lanolin or derivative thereof may be used for some purposes without further treatment, but the solvent is generally distilled off or steam distilled to recover a lower allergenic lanolin or derivative thereof.

The recovered lower allergenic lanolin and its derivatives may be further processed by any conventional method to a variety of lower allergenic lanolin derivatives such as hydrogenated lanolin, acetylated lanolin, ethoxylated anolin, lanolin alcohol, acetylated lanolin alcohol, ethoxylated lanolin alcohol, ethoxylated and acetylated lanolin alcohol, ethoxylated hydrogenated lanolin, ethoxylated and propoxylated hydrogenated lanolin, lanolin fatty acid, lanolin fatty acid ester, lanolin fatty acid polyethylene glycol ester, lanolin fatty acid alkanol amide, lanolin fatty acid soap.

Briefly stated, the present invention provides a simplified and low-cost method for producing a lanolin of lower allergen content or non-allergenic lanolin and derivatives thereof.

The invention will now be described more specifically with reference to the following Examples and a Comparative Example.

EXAMPLE 1

10 g of the lanolin and its derivatives listed in Table 1 were mixed with 100 ml of n-hexane and 100 ml of a mixed solvent of water-ethanol (1:1 by weight) and after standing, the n-hexane layer was collected. To this layer, was added 100 ml of the same solvent of water-ethanol with stirring, and after standing, the n-hexane layer was again collected. This procedure was repeated ten times. At the final stage the n-hexane solvent was removed from the collected n-hexane layer. The recovered residue was employed in allergy tests. The results are shown in Table 1.

Table 1

| Samples | Allergy test results | |
|---|---|---|
| | Untreated | Treated |
| Hydrogenated lanolin | + + + | ± |
| Lanolin alcohol | + + + | ± |
| Purified lanolin | + + | ± |
| Liquid lanolin | + + | ± |

Ten patients with lanolin allergy were subjected to patch tests and examined for positive allergy reactions. The results were expressed by the following notations in order of the degree of allergy. For purposes of comparison, the same notations apply to Examples 2–5.

| + + + | Strong |
|---|---|
| + + | fair |
| + | Slight |
| ± | scarce |
| − | zero |

EXAMPLE 2

10 g of hydrogenated lanolin was mixed with 100 ml of each of the test solvents listed in Table 2 and then with 100 ml of a mixed solvent of water-ethanol (1:1.5). After standing, the test solvent layer was collected. To this layer was added 100 ml of the same solvent of water-ethanol with stirring, and after standing, the test solvent layer was collected. This procedure was repeated ten times. At the final stage the test solvent was removed from the collected solvent layer to recover the residue which was employed in allergy tests. The results are shown in Table 2.

Table 2

| Test solvents | Allergy test results |
|---|---|
| n-Hexane | ± |
| n-Pentane | ± |
| n-Heptane | ± |
| Isobutene | ± |
| Petroleum ether | ± |
| Petroleum benzin | ± |
| Benzene | ± |
| Cyclohexane | ± |
| Ethyl ether | + + |
| Ethyl acetate | + +* |
| Methyl isobutyl ketone | + +* |
| Chloroform | + + + |
| Trichloroethylene | + + + |
| Chlorobenzene | + + |
| Untreated hydrogenated lanolin | + + + |

*Not separated because of emulsification.

EXAMPLE 3

10 g of hydrogenated lanolin was mixed with 100 ml of n-hexane and 100 ml of each of the polar solvents listed in Table 3, and after standing, the n-hexane layer was collected. To this layer was then added 100 ml of the polar solvent with stirring, and after standing, the n-hexane layer was collected. This procedure was repeated five times. At the final stage the n-hexane was removed from the collected n-hexane layer to recover the residue which was employed in allergy tests. The results are shown in Table 3.

Table 3

| Test solvents | Allergy test results |
|---|---|
| Water | + + + |
| Methanol | + + + |
| Ethanol | + + +** |
| Isopropanol | + + +** |
| Butanol | + + +** |
| Octanol | + + +** |
| Water/methanol (1/1 by weight) | ± |
| Water/ethanol (1/1 by weight) | ± |
| Water/propanol (3/2 by weight) | ± |
| Untreated hydrogenated lanolin | + + + |

**Did not separate into two layers

EXAMPLE 4

The procedure of Example 2 was repeated 20 times, except that n-hexane was used as a test solvent. The results are shown in Table 4.

Table 4

| Samples | Allergy test results |
|---|---|
| Sample of this Example | − |
| Hydrogenated lanolin (Untreated) | + + + |

EXAMPLE 5

1.2 Kg of hydrogenated lanolin was extracted with 10 l of n-hexane and 10 l of a mixed solvent of water-ethanol (1:1 by weight) by means of a Podbielniak type extractor (Model 5600 was used). The n-hexane layer was collected, and the solvent was removed to recover the residue which was then tested for allergic reaction. The results are shown in Table 5.

Table 5

| Samples | Allergy test results |
|---|---|
| Sample of this Example | ± ~ + |
| Hydrogenated lanolin | + + + |

Table 5-continued

| Samples | Allergy test results |
|---|---|
| (Untreated) | |

COMPARATIVE EXAMPLE 1

The sample obtained in Example 4 was subjected to thin layer chromatography with the use of FLORISIL (Trademark of Florisil Co., Ltd., the United States of America) having a thickness of 0.25 mm at the adsorbent with chloroform at the developing solvent. No spots were recognized as having the values of Rf less than 0.38 under the conditions.

What is claimed is:

1. A process for producing a lower allergenic lanolin or derivative thereof, which comprises liquid-liquid extracting lanolin or derivative thereof with a non-polar hydrocarbon solvent and a mixed solvent comprising water and a lower alcohol, and then collecting the non-polar hydrocarbon solvent fraction, wherein said liquid-liquid extraction is carried out to an extent such that said lower allergenic lanolin contains substantially no component having an Rf value of less than 0.38 when subjected to thin layer chromatography on 0.25 mm thick magnesium silicate, with chloroform as the developing solvent.

2. The process of claim 1, wherein said non-polar hydrocarbon solvent is an aliphatic hydrocarbon having 3 to 8 carbon atoms.

3. The process of claim 1, wherein said mixed solvent has a ratio of 0.05 to 10 by weight of lower alcohol to water.

4. The process of claim 2, wherein said aliphatic hydrocarbon is selected from the group consisting of hexane, pentane and heptane.

5. The process of claim 2, wherein said aliphatic hydrocarbon is selected from the group consisting of isobutene, 1-butene and 2-butene, or a mixture thereof.

6. The process of claim 3, wherein said lower alcohol is selected from the group consisting of methanol, ethanol and propanol.

7. The process of claim 1, wherein the weight ratio of said mixed solvent to said non-polar hydrocarbon solvent is from 0.1 to 10.

* * * * *